Patented Nov. 12, 1946

2,410,977

UNITED STATES PATENT OFFICE 2,410,977

PROCESS FOR PREPARING NORMAL LEAD SALICYLATE

Leonard M. Kebrich, Brooklyn, N. Y., assignor to National Lead Company, New York, N. Y., a corporation of New Jersey No Drawing. Application October 20, 1942, Serial No. 462,769

1 Claim. (Cl. 260—435)

This invention relates to normal lead salicylate and to a process for making the same.

The only lead salt of salicylic acid whose existence is generally accepted in the chemical literature is normal lead salicylate having the formation $Pb(C_6H_4OHCOO)_2$, which may be monohydrated by the addition of 1 mol $H_2O$. This salt, according to the prior art, was commonly prepared by mixing solutions of a soluble lead salt such as lead acetate or lead nitrate and an alkali metal salicylate, whereby the product is obtained as a white crystalline precipitate. The preparation of normal lead salicylate by this method entails a significant loss of the product in washing and handling operations, owing to its appreciable water solubility.

During the course of the preparation of normal lead salicylate by the method of this invention, namely, by gradually adding salicylic acid to a slurry of lead oxide in a limited amount of water, it was observed that one or more basic lead salicylates were formed before the normal salt was finally obtained. By further investigation it was found that altogether three lead salts of salicylic acid may be formed by this procedure, namely, pentabasic lead salicylate, monobasic lead salicylate and normal lead salicylate. These are formed successively upon the introduction of more and more salicylic acid to a given slurry of lead oxide. The pentabasic and monobasic salts and their methods of manufacture are more particularly described in co-pending application Serial No. 654,801, filed March 15, 1946. This new process differs from prior methods of preparation in that the manner of reacting the salicylic acid with a slurry of lead oxide is carried on so as to produce an orderly succession of chemical reactions, controlled by observing the pH of the solution, and results in a precipitated product with good pigmentary properties. Furthermore, the economical advantages of this invention over the prior art method of precipitating from solutions is readily apparent to those skilled in the art, in that the use of large volumes of wash water is avoided and the yield of the product is substantially complete. Thus the products of this invention are obtained with a minimum of handling and no washing, in a state of high purity without further treatment, except the usual flushing or filtering and drying. If a filtrate is obtained, it may be recycled and used again.

According to this invention, a slurry of lead oxide in water is prepared. Agitation is provided and to this suspension is added, at a slow, uniform rate, salicylic acid either dry or as a water slurry until the pH value falls below pH=4.8, for instance, to about 4.4. The reaction takes place between the lead oxide and the salicyclic acid at room temperature without the presence of a solution forming catalyst such as acetic acid, nitric acid and the like. However, such catalysts may be used in small amounts to initiate the reaction with greater speed.

On the addition of salicylic acid to the lead oxide slurry, the pH remains constant at about 9.9 until pentabasic lead salicylate is formed at which time there is an abrupt change in pH from about 9.9 to about 8.3. On the further addition of salicylic acid, the pH remains constant at about 8.3 until all the pentabasic salt is combined with salicylic acid to form the monobasic salt. The completion of the formation of the monobasic salt is accompanied by an abrupt change in pH from about 8.3 to about 4.8. On the further addition of salicylic acid the pH remains constant at 4.8 until all the monobasic salt is combined with salicylic acid to form the normal salt. The completion of the formation of the normal salt is accomplished by a further abrupt drop in pH value below 4.8.

The following example illustrates the method of preparing normal lead salicylate according to the present invention.

A slurry containing 223 grams (1 mol) of lead monoxide, 1.2 liters of water and 0.5 gram of lead acetate crystals was moderately agitated at room temperature in a suitable vessel. 276 grams (2 mols) of finely powdered salicylic acid were then slowly and uniformly added over a 5 hour period to the suspension. The salicylic acid addition was comparatively more rapid in this case and the slurry became white somewhat after the pentabasic stage was indicated by the change in pH. As the reaction progressed, the pH remained constant and then dropped abruptly indicating that the monobasic salt was formed. During the further addition of salicylic acid after the abrupt change in pH to about 4.8, the pH remained constant until the solid phase consisted solely of normal lead salicylate whereupon the pH value fell to below about 4.8.

At this time the pH begins to decrease rapidly and while the operation may be stopped as soon as the lowering is indicated, it usually reaches a value of about 4.4 in practice. At such a time the operator is enabled to make sure that the reaction forming the normal salt is completed. The fine white product after filtering and drying was found to contain 46.4% lead oxide and 53.6% salicylic anhydride and its specific gravity was 2.36. It had a mean index of refraction of 1.78 and an extinction angle of between 21.5° and 43.7°.

The reactions illustrated in the above examples may, if desired, be operated at elevated temperatures up to the boiling point of water and they may be conducted without the aid of the lead acetate used or any other catalyst.

The normal lead salicylate of the present invention is extremely useful as a pigment and may be employed either alone or in combination with other pigments in formulating improved coating compositions.

Having thus described my invention, I claim as new and useful the following:

A process for preparing normal lead salicylate which comprises forming an aqueous suspension of lead oxide and while agitating the same gradually adding thereto powdered salicylic acid until the pH of the suspension is lowered to a value about 4.4.

LEONARD M. KEBRICH.